(12) United States Patent
Baker

(10) Patent No.: US 7,454,318 B2
(45) Date of Patent: Nov. 18, 2008

(54) METHOD AND TERMINAL FOR DETECTING FAKE AND/OR MODIFIED SMART CARD

(75) Inventor: Keith Baker, Eindhoven (NL)

(73) Assignee: NXP B.V., Eindhoven (NL)

( * ) Notice: Subject to any disclaimer, the term of this patent is extended or adjusted under 35 U.S.C. 154(b) by 21 days.

(21) Appl. No.: 10/542,483

(22) PCT Filed: Dec. 5, 2003

(86) PCT No.: PCT/IB03/05830

§ 371 (c)(1),
(2), (4) Date: Jul. 14, 2005

(87) PCT Pub. No.: WO2004/063979

PCT Pub. Date: Jul. 29, 2004

(65) Prior Publication Data

US 2006/0041402 A1   Feb. 23, 2006

(30) Foreign Application Priority Data

Jan. 14, 2003   (EP) .................................. 03100047

(51) Int. Cl.
*G06F 15/00* (2006.01)
*G06K 19/06* (2006.01)

(52) U.S. Cl. ..................................... 702/189; 235/492

(58) Field of Classification Search ................... 702/189
See application file for complete search history.

(56) References Cited

U.S. PATENT DOCUMENTS

| 5,416,423 | A | 5/1995 | De Borde | |
|---|---|---|---|---|
| 6,695,214 | B1 * | 2/2004 | Leydier et al. | 235/492 |
| 6,917,299 | B2 * | 7/2005 | Fu et al. | 340/686.1 |
| 2002/0104052 | A1 * | 8/2002 | Nolles et al. | 714/733 |
| 2002/0188852 | A1 * | 12/2002 | Masaki et al. | 713/182 |
| 2003/0178974 | A1 * | 9/2003 | Rozsypal | 323/224 |

\* cited by examiner

*Primary Examiner*—Bryan Bui
*Assistant Examiner*—Jonathan Moffat

(57) ABSTRACT

This invention relates to a method and a terminal for detecting a fake and/or modified smart card inserted into a physical interface of a terminal, the method comprising the steps of performing a sequence of current measurements by a current monitor in order to obtain a first current signature, comparing the obtained first current signature with a second current signature, representing a unique current signature of a smart card, and determining whether a difference exists within a predetermined range between the first current signature and the second current signature. This allows for simple detection of fake and/or modified smart cards. Further, it is possible to detect (and thereby protect against) false cards and/or 'rouge' application residing on a smart card.

10 Claims, 2 Drawing Sheets

METHOD AND TERMINAL FOR DETECTING FAKE AND/OR MODIFIED SMART CARD

FIELD OF THE INVENTION

The invention relates to a method, and a corresponding terminal, of detecting a fake and/or modified smart card inserted into a physical interface of a terminal.

BACKGROUND OF THE INVENTION

Smart cards are commonly used in a wide range of applications for the purpose of authority check, payment, satellite TV, data storage, etc. As an example the health insurance and banking industries use smart cards extensively. A smart card usually resembles a credit card in size and shape, but typically contains an embedded microprocessor inside. A terminal with a card reader communicates with the microprocessor which controls access to the data on the card. Smart cards may e.g. be used with a smart card reader attached to or located in a personal computer to authenticate a user, etc. Smart card readers can also be found in mobile phones for SIM reading and vending machines.

For a private and/or in-home terminal with a smart card reading capability, such as a set top box (STB), integrated digital television (IDTV), Digital TVs, home gateways, access systems, GSMs, Internet audio sets, car systems, etc. the possibilities to spy on the electronic communication between a smart card and/or a secure access card and the terminal is much greater than in a public automated teller machine (ATM) or similar semi-public/public terminals e.g. used for/in connection with e-commerce. This enables attack on the smart card that is not possible with conventional smart card applications in public and/or semi-public terminals, due to the operation in a private sphere.

A financial and service industry consortium Finread in Europe is attempting to standardize a form of e-commerce terminals used in public ATM and personal computers (PCs), and also for future STBs. IDTV and similar home terminals. Up until now, the consortium has focused on expensive tamper detection and tamper resistant constructions for home e-commerce terminals. Embedded Finread is a part of the Finread consortium examining the issues of low-cost terminals for e-commerce such as IDTV, Jave terminals and STBs. The cost of tamper resistant and other counter measures normally adopted for dedicated terminals (i.e. ATMs) are considered to complex and/or expensive for the low cost home terminals.

A variety of smart cards/secure access cards exist, some with no sophisticated processing power, typically memory only cards. Other cards, typically so-called multi-application/multi-function cards, comprise more advanced properties and functions typically providing secure authentication of the user/owner of the card e.g. in relation to gaining access to equipment, accounts, functions, transfer of money, e-commerce applications, etc.

Such cards have on-card dynamic data processing capabilities and allocate card memory into independent sections assigned to a specific function and/or application.

The multi-application/multi-function smart card is distributed by one issuer but allows two or more applications/functions to be resident on the smart card. Typically, advanced 32-bit processor cards are used for this purpose.

A Java smart card is a smart card with a Java Virtual Machine (JVM) that allows applications to enter and reside on the card. In this way, a Java smart card is a first step towards multi-application smart cards.

As mentioned traditional smart cards only run one process, while a Java smart card have the capability to run multiple processes on the card, which is an enhancement of the smart card protection capability that allows the smart card not only to perform secured transaction, but also to monitor itself and the presence of an attack.

A device typically designated a sub-terminal is a device which includes some features of a terminal, i.e. user input, display, storage and a remote connection to the Internet, or a broadcast channel, but not all. Thus a terminal is complete, and examples are e.g. IDTV, STB or GSM (or similar cellular systems like 3G, UMTS, GPRS, etc.), but a sub-terminal is incomplete. In this way, a sub-terminal is a low-cost version of a terminal that provides some but not all the functionality of a terminal. One example of a sub-terminal is e.g. a TV remote control. The sub-terminal may e.g. also be the conditional access module (typically denoted POD (point of deployment) in the US) of the conditional access system implemented in a STB and/or a TV. The conditional access module is a DVB based term derived from the Common Interface concept for DVB terminals.

Most system can be attacked successfully by a sufficiently resourced attacking entity. It is however necessary to provide sufficient defense (protection and/or detection) against a reasonably resourced security attack or at least provide counter measures that are sufficient to make a single form of attack no more successfully than others. It is also desirable to enable this in an inexpensive way.

A fake terminal can be used to gain access to an unwary user's pin-code or other application information of the card, which is hard to defend against, and would require other protection/detection schemes than provided by the present invention.

However, a typical security attack on genuine terminals/sub-terminals is to use a smart card emulating the function of a valid card and/or use a modified smart card, e.g. modified in order to gain access to otherwise restricted services, functions, etc in a terminal.

Patent specification U.S. Pat. No. 5,416,423 discloses a method of verifying the integrity of a smart card by detecting the capacitance of wires connecting the card. However, this specific verifying method requires that electrical wires are connected to the card in order to gain information regarding whether a smart card simulating an external circuit is coupled thereto. Further, it is known to design and program a smart card, which for an ordinary card reading terminal may be functionally indistinguishable from an authorized card. The terminal according to the above-mentioned patent specification is not able to detect a smart card emulating another smart card, i.e. when no external circuit is attached thereto with wires.

OBJECT AND SUMMARY OF THE INVENTION

It is an object of the invention to provide a method (and corresponding terminal) of detecting a fake and/or modified smart card inserted into a physical interface of a terminal, where the method (and terminal) provides detection and/or protection against some classes of substitution of a valid card by another and/or tampering with a valid smart card. A further object is to provide this in a simple way. Yet a further object is to enable detection of smart cards comprising unauthorized application like rogue digital TV application (i.e. so called 'roguelets').

This is achieved by a method (and corresponding system) of detecting a fake and/or modified smart card inserted into a physical interface of a terminal, the method comprising the steps of:

performing a sequence of current measurements by a current monitor in order to obtain a first current signature, comparing the obtained first current signature with a second current signature, representing a unique current signature of a smart card, and determining whether a difference exists within a predetermined range between the first current signature and the second current signature.

In this way, a simple way of detecting fake and/or modified smart cards is obtained. Further, it is possible to detect (and thereby protect against) false cards and/or 'rouge' application residing on a smart card.

In a preferred embodiment, the second current signature is a IDDQ current signature or a ICCQ current signature.

In this way, a simple and reliable way of obtaining a signature that unique to a smart card is provided.

In one embodiment, the method further comprises the step of:

regulating the use of the smart card on the basis of said step of determining.

In this way, it is possible to perform various appropriate actions like monitoring the use of a fake/modified card closely, refuse the card entirely, etc.

In one embodiment, the method further comprises the step of:

measuring and storing a current signature of a smart card coupled to the terminal.

Hereby, a comparison may be made between the known signature stored by the terminal (locally and/or remotely) and of the card when a subsequent transaction is made using the card, thereby enabling detection of whether the card have been modified in the meantime.

In a preferred embodiment, the sequence is determined by a self-test program to be executed by and residing in the smart card.

In this way, the sequence of the test program is then fixed and known, both to the manufacturer of the card and the testing application of the terminal (101).

In one embodiment, the second current signature is retrieved from a database and/or is comprised in a digital certificate.

The present invention also relates to a terminal corresponding to the method according to the present invention.

More specifically, the invention relates to a terminal for detecting a fake and/or modified smart card inserted in a physical interface of the terminal, the terminal comprising:

a controller adapted to perform a sequence of current measurements in order to obtain a first current signature, and a current monitor for performing said sequence of current measurements, wherein the controller is further adapted to:

compare the obtained first current signature with a second current signature, representing a unique current signature of a smart card, and determining whether a difference exists within a predetermined range between the first current signature and the second current signature.

In a preferred embodiment, the second current signature is a IDDQ current signature or a ICCQ current signature.

In one embodiment, the terminal further comprises means for:

regulating the use of the smart card on the basis of said step of determining.

In one embodiment, the terminal further comprises means for:

measuring and storing a current signature of a smart card coupled to the terminal.

In one embodiment, the sequence is determined by a self-test program to be executed by and residing in the smart card.

In one embodiment, the second current signature is retrieved from a database and/or is comprised in a digital certificate.

Further, the invention also relates to a computer readable medium having stored thereon instructions for causing one or more processing units to execute the method according to the present invention.

DESCRIPTION OF PREFERRED EMBODIMENTS

Figure 1:
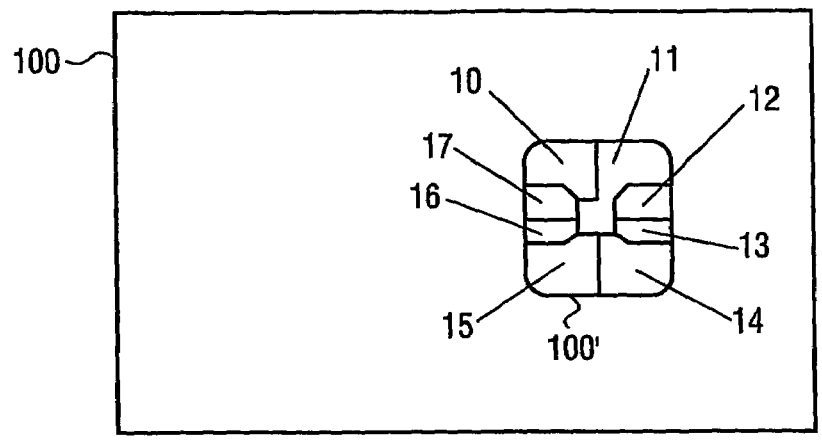
FIG. 1 schematically illustrates a smart card.

FIG. 1 schematically illustrates a typical smart card. Shown is a security card/a smart card (100) that is well known in the prior art. Typically the card (100) has the form of standard size credit card, although the form, layout, size, etc. may vary. The card (100) typically comprises embedded memory, a processor/controller and input/output (I/O) used for communication with an appropriate card reader/(sub-)terminal (not shown) via a number of contacts (100'). The shown contacts (100') (the size of which is exaggerated/enlarged for illustrative purposes) complies with the standard of ISO 7816 part 2 and comprises power supply (10), ground (11), three optional contacts/pins (12, 14, 15) that may be used for different functionality dependent on the specific card, a bi-directional input/output pin (13), check (16) and reset (17). All of these signals are provided by a terminal, receiving the card, to the smart card (100), and the terminal is expected to monitor the bi-directional input/output (13) according to the standard protocols in order to observe the response of the smart card (100).

Such a card (100) may be used to store information like PIN-codes, identification information, personal information, security information, etc.

Figure 2:
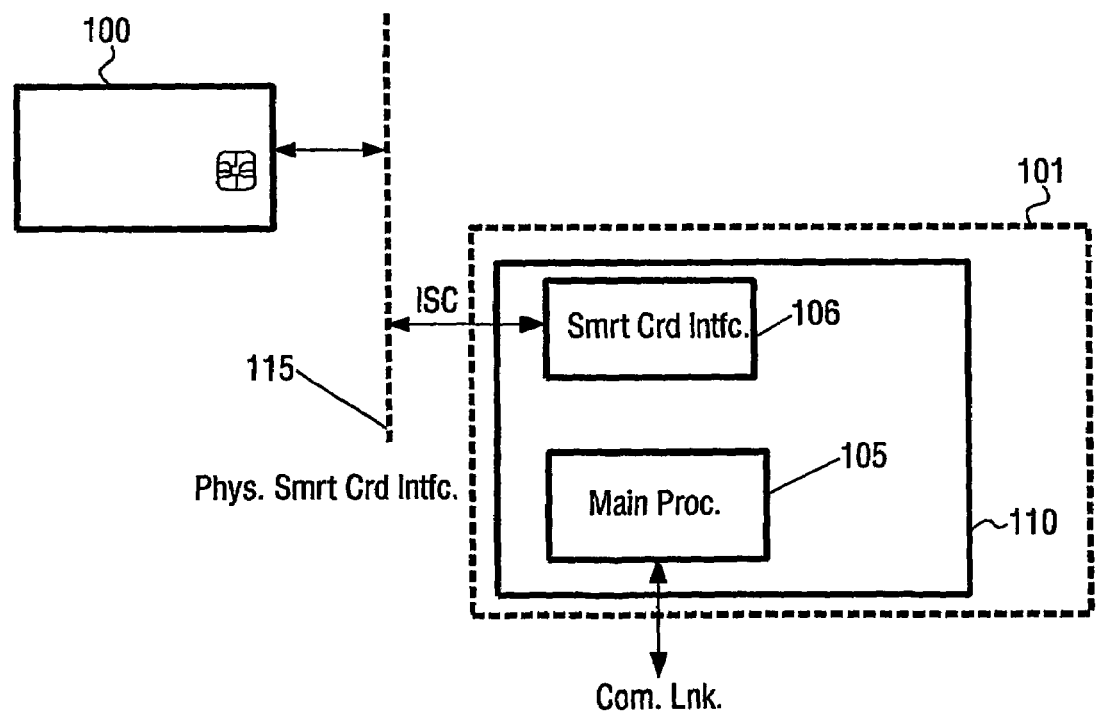
FIG. 2 illustrates a smart card and a prior art terminal.

FIG. 2 illustrates a smart card and a typical prior art terminal. Shown are the smart card (100) and the terminal (101) that communicates via a smart card interface. The terminal (101) comprises a main processor (105) and a smart card interface (106) and optionally a communications/IP link e.g. useful for various e-commerce application or other functions.

When inserted in a private and/or home terminal/sub-terminal (101) (both forth denoted terminal), a smart card (100) would be supplied with power from a power supply from a central source, and the ground would be the central ground of the terminal's (101) electrical systems, since a smart card (100) does not have a power supply. Control signals of a smart card interface (106) in the terminal (101) would typically be provided by a serial interface programmed by the central processor(s) (105) of the terminal (101) to execute the standard protocols to address the smart card's interface. This is a very cheap and flexible arrangement, which allows developers of terminal/STB software to use standard electronic interfaces and processes to access the cards. However, the usage of a standard serial interfaces makes the terminal (101) open to forms of tampering by spying on the communication, as described above.

Figure 3:
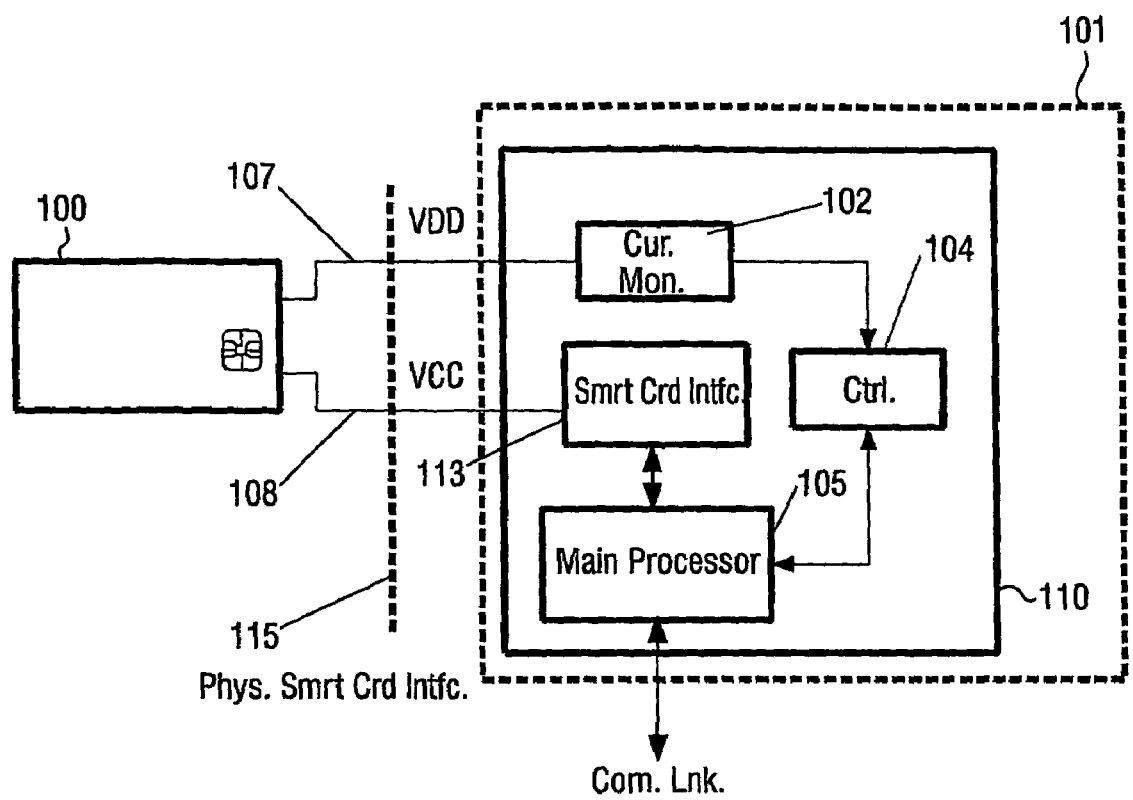
FIG. 3 schematically illustrates a terminal according to an embodiment of the present invention.

FIG. 3 schematically illustrates a terminal according to an embodiment of the present invention. Shown is a smart card (100) corresponding to the one shown and explained in connection with FIG. 1. Also shown is a terminal (101) corresponding to the one shown and explained in connection with FIG. 2, with the exception that it further comprises a monitoring circuit (102) and a controller (104), where the monitoring circuit (102) is connected to a physical smart card interface (115) and the controller (104) and the controller (104) is further connected to the main processor(s) (105). Preferably, the monitoring circuit (102), the controller is also integrated in/embedded into an IC (110) in the terminal (101), where the IC (110) controls the physical smart card interface (115).

In order to detect if a smart card (100) coupled to the physical interface (115) is fake and/or modified, a current signature (i.e. a first current signature) of the actual smart card (100) coupled to the terminal (101) is obtained.

A fake and/or modified smart card (100) may emulate the functions of a valid and authorized card, but will not demonstrate the same current signature since a current signature for each card according to the present invention is unique. In this way, it is possible to detect both fake cards and originally valid cards that have been tampered with e.g. to gain access to other applications in a very simple way, as explained in more detail in the following.

The monitoring circuit (102) is preferably a dynamic current monitoring circuit that allows a current of a connection with the smart card (100) to be detected, determined, monitored, etc.

The current monitoring circuit (102) is more specifically connected to the $V_{DD}$ (e.g. the power pin (10) in FIG. 1) input of the physical card interface (115). Alternatively, the monitoring circuit (102) may be connected to the $V_{CC}$ (e.g. the ground pin (11) in FIG. 1) input of the physical interface (115) instead or both (which enhances the security even further). In this way detection may be performed either on $V_{DD}$ or $V_{CC}$ or both.

The physical interface (115) couples/electrically connects the IC (110) and the smart card (100) and is a DC interface preferably with a control level of decoupling of the VDD line to earth.

The current may be measured according to a number of techniques including using one or more current mirrors, one or more voltage drop sensors, etc. A number of the techniques for measuring a current signature of integrated circuits have been described in the literature and is typically used for the purpose of IC debug, test and measurement.

These techniques comprise methods for monitoring e.g. either the $I_{DDQ}$ or and/or the $I_{CCQ}$. They also provide the capability to integrate the current monitoring circuit (102) with voltage regulation of a power supply to ensure correct operation of the smart card (100).

The process of measuring the leakage current of CMOS integrated circuits or finished products that contain CMOS ICs is typically known as '$I_{DDQ}$' or '$I_{CCQ}$' testing. The $I_{DDQ}$/$I_{CCQ}$ is a static current that occurs during the quiescent state of a CMOS circuit. The measurement according to the present invention measures a current of the $V_{DD}$ and/or $V_{CC}$ power supply while the IC is in the quiescent state. As mentioned, $I_{DDQ}$ or $I_{CCQ}$ testing is normally used in connection with IC debug, test and measurement, e.g. to check for shorted gate oxide and other IC defects that may cause a failure over time.

The magnitude of the current is typically very small since it is the sum of the leakage of the pairs of P and N MOSFET networks from the gates of the circuit. The actual current is determined by the Vt of the MOSFET's, where Vt of the MOSFET is a random variable across the die and wafer. This random variable is controlled during manufacturing to very strict limits; nevertheless each circuit has a unique $I_{DDQ}$ (and $I_{CCQ}$) characteristic when measured over a set of states. Therefore such measurements if very suitable for being used to detect altered/fake smart cards according to the present invention.

An execution control program in the controller (104) in the IC of the terminal determines the timing of sampling of the current. This program will determine when in the program the current signature should be measured, how it should be compared to the known signature (i.e. a second current signature), and any actions that should be undertaken as a consequence of the comparison. To avoid tampering, as many as possible of these actions should autonomous of the middleware of the terminal (100).

In order to measure the current signature, the smart card must be driven through a number/a sequence of states. These states may be entered in any order, but the logic state of the circuit must be known for the current measurement to be compared to the expected or known current. A simple way to change the state of the smart card (100) is for a self-test program to be executed by and residing in the smart card (100). In this way, the sequence of the test program is then fixed and known, both to the manufacturer of the card and the testing application of the terminal (101).

Preferably, the expected/known/second current signature is a range with limits, i.e. of a nominal current, a low and a high limit. Further, the current signature may be calibrated/modified, if required, to compensate for variability caused by extremes of temperature. Such techniques are well known in the IC testing community, as they are common to most test programs where testing at room and high temperatures are employed.

The signature of the individual card may be retained in a database or other storage e.g. by an issuer of the card and any verification of a transaction preferably uses the smart card (101) current signature to verify authenticity. The database or storage may e.g. be local or remote, where the communications/IP link may be used to retrieve the information. Alternatively, the current signature may also be part of a digital signature e.g. also obtainable by the communications/IP link.

Further, the current signature may be measured by a circuit (not shown) in the terminal (101) and stored for future use. In this way, a comparison may be made between the known signature stored by the terminal (locally and/or remotely) and of the card when a subsequent transaction is made using the card, thereby enabling detection of whether the card have been modified in the meantime.

Additionally, more complex schemes with characteristic signatures for a type of card or application of the card may readily be devices. However, in these complex schemes some part typically must have a unique sequence of measurement related to this specific instance.

The length of the current signatures may be of virtual unlimited length. Current measurement techniques have been developed that are very close to the speed of operation of the specific circuit. Given that CMOS smart cards are very low performance devices where power dissipation is limited, continuous monitoring of current signatures is possible without loss of throughput.

Further, schemes maybe devised where the card (100) signals/communicate to the terminal (101) via the current signature. This signaling via the current signature, could e.g. be implemented as part of a specific application, and would be very useful where the normal communication between the card (100) and the terminal (101) is suspect, or in a case where the card (100) has been inserted in a fake terminal and the applications residing on the card is seeking some confirmation of the authenticity of the terminal. This capability to create or modify current signatures is employed by smart cards to resist attack on the cryptographic algorithms using current monitoring techniques. So extensions of the circuit to allow communication will be relatively simple and easy to implement.

The invention claimed is:

1. A terminal for detecting a fake and/or modified smart card inserted in a physical interface of the terminal, the terminal comprising:
   a controller configured to perform a sequence of current measurements in order to obtain a first current signature, and
   a current monitor for performing said sequence of current measurements,
   wherein the controller is further configured to:
   compare the obtained first current signature with a second current signature, representing a unique current signature of a smart card, wherein the second signature is an IDDQ signature or an ICCQ signature, and
   determine whether a difference exists within a predetermined range between the first current signature and the second current signature.

2. A terminal according to claim 1, wherein the terminal further comprises means for:
   regulating the use of the smart card on the basis of said step of determining.

3. A terminal according to claim 1, wherein the terminal further comprises means for:
   measuring and storing a current signature of a smart card coupled to the terminal.

4. A terminal according to claim 1, wherein said sequence is determined by a self-test program to be executed by and residing in the smart card.

5. A terminal according to claim 1, wherein said second current signature is retrieved from a database and/or is comprised in a digital certificate.

6. A method of detecting a fake and/or modified smart card inserted into a physical interface of a terminal, the method comprising:
   performing a sequence of current measurements by a current monitor in order to obtain a first current signature,
   comparing the obtained first current signature with a second current signature, representing a unique current signature of a smart card, wherein the second current signature is a IDDQ current signature or a ICCQ current signature, and
   determining whether a difference exists within a predetermined range between the first current signature and the second current signature.

7. A method according to claim 6, wherein the method further comprises:
   regulating the use of the smart card on the basis of said step of determining.

8. A method according to claim 6, wherein the method further comprises:
   measuring and storing a current signature of a smart card coupled to the terminal.

9. A method according to claim 6, wherein the sequence is determined by a self test program to be executed by and residing in the smart card.

10. A method according to claim 6, wherein the second current signature is retrieved from a database and/or is comprised in a digital certificate.

* * * * *